US011080149B2

(12) United States Patent
Anderson et al.

(10) Patent No.: US 11,080,149 B2
(45) Date of Patent: *Aug. 3, 2021

(54) RESTORE CURRENT VERSION OF A TRACK FROM A NON-VOLATILE STORAGE INTO A NEW LOCATION IN CACHE

(71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Matthew G. Borlick, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/445,177

(22) Filed: Jun. 18, 2019

(65) Prior Publication Data

US 2019/0303248 A1 Oct. 3, 2019

Related U.S. Application Data

(63) Continuation of application No. 15/693,469, filed on Aug. 31, 2017, now Pat. No. 10,387,272.

(51) Int. Cl.
*G06F 11/00* (2006.01)
*G06F 11/14* (2006.01)
(Continued)

(52) U.S. Cl.
CPC .......... *G06F 11/1469* (2013.01); *G06F 3/065* (2013.01); *G06F 3/0619* (2013.01);
(Continued)

(58) Field of Classification Search
CPC ............ G06F 11/1469; G06F 11/1451; G06F 11/2033; G06F 11/1658; G06F 3/0619;
(Continued)

(56) References Cited

U.S. PATENT DOCUMENTS

| 5,532,463 A | 7/1996 | Debelleix et al. |
| 7,051,174 B2 | 5/2006 | Ash et al. |

(Continued)

OTHER PUBLICATIONS

U.S. Appl. No. 15/693,469, filed Aug. 31, 2017.
(Continued)

*Primary Examiner* — Marc Duncan
(74) *Attorney, Agent, or Firm* — Konrad, Raynes, Davda & Victor LLP; David W. Victor; Alan S. Raynes (57) ABSTRACT

Provided are a computer program product, system, and method for restoring tracks in cache. A restore operation is initiated to restore a track in the cache from a non-volatile storage to which tracks in the cache are backed-up. The non-volatile storage includes a current version of the track and wherein a previous version of the track subject to the restore operation is stored in a first location in the cache. A second location in the cache is allocated for the current version of the track to restore from the non-volatile storage. The data for the current version of the track is transferred from the non-volatile storage to the second location in the cache. Data for the track is merged from the second location into the first location in the cache to complete restoring to the current version of the track in the first location from the non-volatile storage.

20 Claims, 5 Drawing Sheets

(51) Int. Cl.
    *G06F 12/128*     (2016.01)
    *G06F 3/06*     (2006.01)
    *G06F 11/20*     (2006.01)

(52) U.S. Cl.
    CPC ........ *G06F 3/0685* (2013.01); *G06F 11/1451* (2013.01); *G06F 11/2033* (2013.01); *G06F 11/2092* (2013.01); *G06F 12/128* (2013.01); *G06F 2201/805* (2013.01); *G06F 2201/82* (2013.01); *G06F 2212/621* (2013.01)

(58) Field of Classification Search
    CPC .. G06F 3/065; G06F 3/0685; G06F 2212/621; G06F 12/128
    See application file for complete search history.

(56) References Cited

U.S. PATENT DOCUMENTS

| | | | |
|---|---|---|---|
| 7,111,189 B1 * | 9/2006 | Sicola | G06F 11/2092 714/15 |
| 7,451,345 B2 * | 11/2008 | Butterworth | G06F 11/2082 714/6.3 |
| 9,304,937 B2 | 4/2016 | Achilles et al. | |
| 9,372,908 B2 | 6/2016 | Benhase et al. | |
| 9,910,777 B2 | 3/2018 | Flynn et al. | |
| 10,387,272 B2 * | 8/2019 | Anderson | G06F 11/1469 |
| 2004/0059870 A1 | 3/2004 | Ash et al. | |
| 2007/0186058 A1 | 8/2007 | Ash et al. | |
| 2017/0097909 A1 | 4/2017 | Simionescu et al. | |
| 2018/0239547 A1 * | 8/2018 | Inbar | G06F 3/0646 |
| 2019/0065325 A1 | 2/2019 | Anderson et al. | |

OTHER PUBLICATIONS

Notice of Allowance dated Apr. 11, 2019, pp. 12, for U.S. Appl. No. 15/693,469, filed Aug. 31, 2017.

List of IBM Patents or Patent Applications Treated as Related, Jun. 18, 2019, pp. 2.

* cited by examiner

RESTORE CURRENT VERSION OF A TRACK FROM A NON-VOLATILE STORAGE INTO A NEW LOCATION IN CACHE

BACKGROUND OF THE INVENTION

1. Field of the Invention

The present invention relates to a computer program product, system, and method to restore a current version of a track from a non-volatile storage into a new location in cache.

2. Description of the Related Art

In a storage environment, a storage system may include redundant processors and components that communicate to manage access to a shared storage. The redundant processor nodes may each include a cache to cache tracks for read and write requests to the common storage managed by both of the processor nodes and a non-volatile storage (NVS). The NVS in each processor node backs up modified data in the cache of the other processor node to provide backup storage on a separate power boundary.

The cache maintains cache directory control blocks (CDCB) and a cache segment control block (CSCB) providing metadata on tracks in cache. The NVS maintains an NVS control block (NVSCB) having information about customer tracks in the NVS, including segment numbers in the NVS at which the customer data is stored. When new data (N version) for a track is written to the NVS, the new data is written to a new location in the NVS, so as not to overwrite the previous (N−1) version of the track. The new data is then atomically merged with the N−1 data to replace the N−1 data with the current N version of the track.

During operations, NVS customer data may be restored back to cache for tracks in the cache when host writes to the track in the cache are aborted. To restore a track from an NVS to cache, the cache CDCB is set to indicate a "restore-in-progress" from the NVS and a direct memory access (DMA) operation is performed to transfer segments for the track in the NVS and directly overlay onto the cache segments in the cache for the track. After the DMA completion, the restored cache data is verified and, if valid, the "restore-in-progress" indicator is reset to indicate that the restore is complete.

During a warmstart recovery, NVS customer data is restored back to the cache for tracks that were write-in-progress before the warmstart or that are indicated as "restore-in-progress".

When a failover occurs from one processor node to the other processor node while a track is being restored from the NVS in the processor node that is failing over to the other processor node having the cache to which the data is being restored, then the cache track in the cache is pinned as non-retryable and invalid, and data loss is reported.

There is a need in the art for improved techniques for managing restore-in-progress from an NVS to cache.

SUMMARY

Provided are a computer program product, system, and method for restoring tracks in cache. A restore operation is initiated to restore a track in the cache from a non-volatile storage to which tracks in the cache are backed-up. The non-volatile storage includes a current version of the track and wherein a previous version of the track subject to the restore operation is stored in a first location in the cache. A second location in the cache is allocated for the current version of the track to restore from the non-volatile storage. The data for the current version of the track is transferred from the non-volatile storage to the second location in the cache. Data for the track is merged from the second location into the first location in the cache to complete restoring to the current version of the track in the first location from the non-volatile storage.

DETAILED DESCRIPTION

When a failover occurs from one processor node to the other processor node while a track is being restored from the NVS in the processor node that is failing over to the other processor node having the cache to which the data is being restored, then there is no way to know whether some or all of the data from the NVS arrived in the cache after the failover. In such case, in the prior art, the track in the cache for which there is a restore-in-progress when the failover occurred at the processor node having the NVS, is pinned and marked as invalid.

Described embodiments improve computer technology related to the processing of the restore-in-progress when a failover occurs to avoid having to mark the track in the cache as invalid and report a data loss. With described embodiments, when performing a restore operation from an NVS to a track in cache having a previous version of a track at a first location in the cache, the current version of the track in NVS is transferred to a second location in the cache. The newer data in the second location may then be merged with the track having the previous version of the data as part of an atomic operation that cannot be interrupted by a failover or warmstart. With the described embodiments, if the failover occurs after the restore has started and before the merging of the data, then the track in the cache may continue to be used because it has not been overwritten and the data from the NVS in the second location is demoted. In this way, the restore-in-progress does not affect the state of the track in the cache which may continue to be used after a failover because the segments from the NVS are first restored into a different location in the cache from the track to be restored. Thus, with described embodiments, a failover during a restore-in-progress does not result in the restored tracks in cache being pinned as invalid. Instead, the version of the track in cache prior to the restore may continue to be used without causing interruptions that would result if the track were pinned as invalid.

Figure 1:
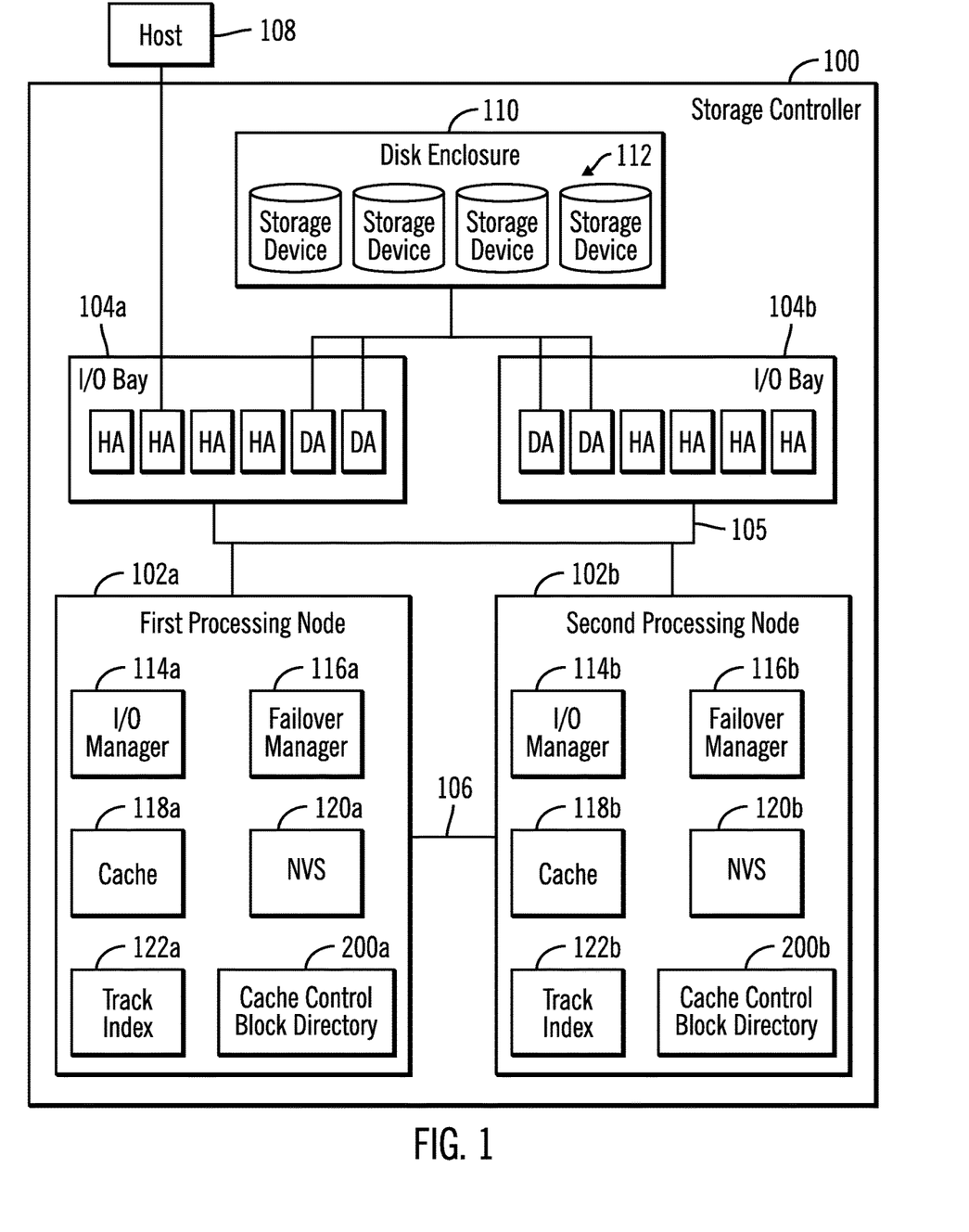
FIG. 1 illustrates an embodiment of a storage system.

FIG. 1 illustrates an embodiment of a storage controller 100 including a plurality of independent processing nodes 102a, 102b, such as a central electronics complex (CEC), that each connect to Input/Output (I/O) bays 104a, 104b having device adaptors (DA) and hardware adaptors (HA) therein, over a bus interface 105, such as a Peripheral Component Interconnect Express (PCIe) bus. The processing nodes 102a, 102b may also communicate with each other directly over a link 106, such as a PCIe bus. Host systems, such as host 108, may connect to the storage controller 100 through a host adaptor (HA) in the I/O bays 104a, 104b.

A disk enclosure 110 includes a plurality of storage devices 112 in which logical volumes and tracks are configured. Each processing node 102a, 102b is assigned one of the device adaptors in each of the I/O bays 104a, 104b that connect to the disk enclosure 110 to provide access to data configured in the storage devices 112. Each processing node 102a, 102b has a default configuration to default communicate with a device adaptor (DA) in one of the I/O bays 104a, 104b, where the default configuration will assign the different processing nodes 102a, 102b to device adaptors in different of the I/O bays 104a, 104b.

Each processing node 102a, 102b includes an I/O manager 114a, 114b to manage I/O requests from attached hosts to storage space configured in the storage devices 112 of the disk enclosure 110, and perform other related operations, such as path selection and error handling. Each processing node 102a, 102b further maintains a failover manager 116a, 116b to determine whether to failover to the other processing node 102a, 102b or to failover from a currently used device adaptor (DA) in one of the I/O bays 104a, 104b to the other of the device adaptors (DA) in the other of the I/O bays 104b, 104a.

Each processing node 102a, 102b further includes a cache 118a, 118b to cache tracks from the storage devices 112 and a non-volatile storage ("NVS") 120a, 120b to provide a backup storage of modified tracks in the other cache 118b, 118a, respectively. In this way, NVS 120a provides backup storage of the tracks in cache 118b and NVS 120b provides backup storage of the tracks in cache 118a. If the tracks in a cache 118a, 118b become corrupted or are lost, then they may be restored from the NVS 120b, 120a providing the backup storage. Because each processing node 102a, 102b may be on a separate power boundary, the NVS 120a, 120b in one processing node 102a, 102b provides backup storage for the modified tracks in the cache 118b, 118a of the other processing node 102b, 102a to be made available in case the other processing node experiences failure or data loss/corruption.

Each processing node 102a, 102b maintains in memory a track index 122a, 122b providing an index of tracks in the respective cache 118a, 118b to cache control blocks in a control block directory 200a, 200b. The control block directory 200a, 200b includes the cache control blocks, where there is one cache control block for each track in the cache 118a, 118b providing metadata on the track in the cache 118a, 118b. The track index 122a, 122b associates tracks with the cache control blocks providing information on the tracks in the cache 118a, 118b.

In the embodiment of FIG. 1, two redundant processing nodes 102a, 102b and two I/O bays 104a, 104b are shown. In further embodiments, there may be more than the number of shown redundant elements 102a, 102b, 104a, 104b, to provide additional redundancy.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices 112 in the disk enclosure 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 112 in the disk enclosure 110 may comprise heterogeneous storage devices from different vendors and different types of storage devices, such as a first type of storage devices, e.g., hard disk drives, that have a slower data transfer rate than a second type of storage devices, e.g., SSDs.

The caches 118a, 118b may comprise a byte addressable write-in-place memory device, where data is updated by overwriting the previous version of the data with the new version, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc.

The non-volatile storage ("NVS") 120a, 120b may comprise a non-volatile copy-on-write memory device where a new version of the data is written to a new location in the storage, such as NAND storage, e.g., flash memory, Solid State Drive (SSD) storage, etc. Other non-volatile devices may be used for the non-volatile storage 120a, 120b, such as a battery backed-up DIMM.

The components, such as the I/O managers 114a, 114b, host adaptors (HA), and device adaptors (DA) may be implemented in computer readable program instructions in a computer readable storage medium executed by a processor and/or computer hardware, such as an Application Specific Integrated Circuit (ASIC).

Figure 2:
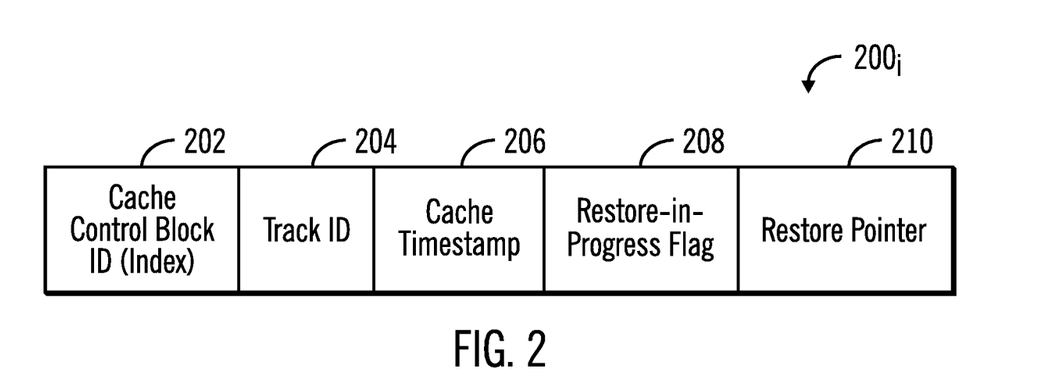
FIG. 2 illustrates an embodiment of a cache control block.

FIG. 2 illustrates an embodiment of a cache control block 200$_i$ in one of the cache control block directories 200a, 200b for one of the tracks in the cache 118a, 118b, including, but not limited to, a cache control block identifier 202, such as an index value of the cache control block 200; a track ID 204 of the track in a volume of the storage 112; a cache timestamp 206 indicating a time the track was added to the cache 118a, 118b; a restore-in-progress flag 208 indicating whether the track in cache 118a, 118b is being restored from the NVS 120b, 120a in the other processing node 102b, 102a; a restore pointer 210 pointing to a cache control block 200$_j$ for the track in the cache 118a, 118b to which the current version of the track is being transferred from the NVS 120b, 120a. Additional track metadata may also be included.

Figure 3:
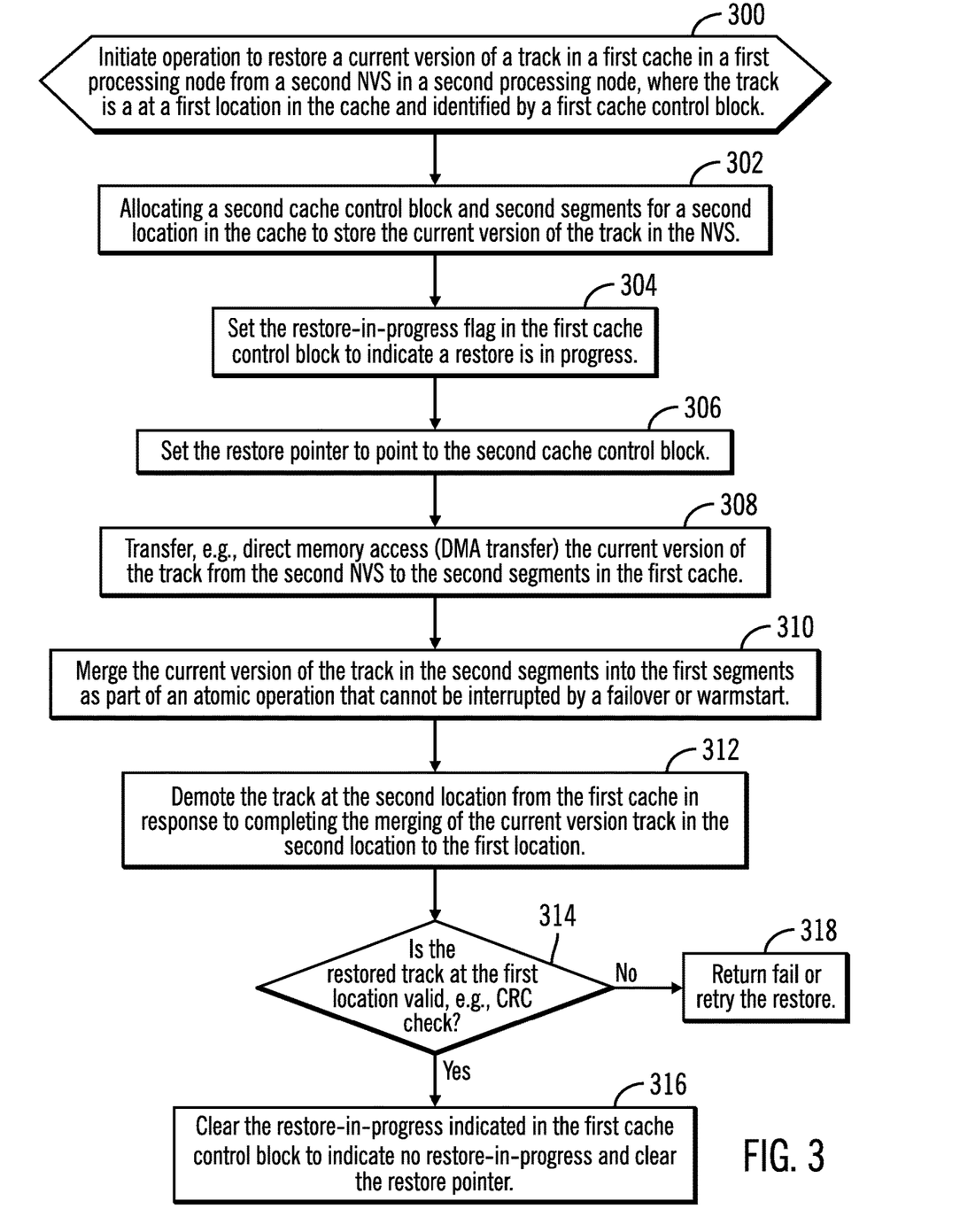
FIG. 3 illustrates an embodiment of operations to restore a track from a non-volatile storage to cache.

FIG. 3 illustrates an embodiment of operations performed by the I/O manager 114a, 114b in one of the processing nodes 102a, 102b to restore a current version of a track from the NVS 120b, 120a in the other processing node 102b, 102a to a previous version of the track in the cache 118a, 118b. The operations are described with respect to restoring a current version of a track from NVS 120b in the second processing node 102b to the previous version of the track in the cache 118a in the first processing node 102a. The operations may also be performed with respect to restoring a track from the NVS 120a in the first processing node 102a to the cache 118b in the second processing node 102b. Upon initiating (at block 300) an operation to restore the current version of a track from the NVS 120b to a previous version of the track in a first location in the cache 118a and identified by a first cache control block $200_1$, the I/O manager 114a allocates (at block 302) a second cache control block $200_2$ and second segments for a second location in the cache 118a to store the current version of the track in the NVS 120b. The restore-in-progress flag 208 in the first cache control block $200_1$ is set (at block 304) to indicate a restore to the track is in-progress. The restore pointer 210 is set (at block 306) to point to the second cache control block $200_2$ allocated for the current version of the track that will be transferred from the NVS 120b in the other cluster 102b.

The I/O manager 114a initiates (at block 308) a direct memory access (DMA) transfer of the current version of the track in the NVS 120b in the second processing node 102b to the second segments at the second location in the cache 118a in the first processing node 102a via interfaces 105 or 106. The I/O manager 114a may then merge (at block 310) the current version of the track in the second segments at the second location in the cache 118a into the first segments for the first location having the previous version of the track as part of an atomic operation that cannot be interrupted by a failover or warmstart. After updating the first location in the cache 118a, the second current version of the track at the second location is demoted (at block 312) from the cache 118. The I/O manager 114a may then perform (at block 314) a validation check of the restored data, for example, validate using a cyclical redundancy check (CRC) error correction code. If (at block 314) the restored track is valid or can be error corrected, then the restore-in-progress flag 208 in the first cache control block $200_1$ is cleared (at block 316) to indicate there is no restore-in-progress and the restore pointer 210 is invalidated. If (at block 314) the restored track cannot be validated, then failure is returned or the restore is retried.

With the described embodiment of operations of FIG. 3, to restore a current version for a track from the NVS 120b, the current version is copied to a new location in the cache 118a and then merged with the previous version of the track in the cache 118a.

Figure 4:
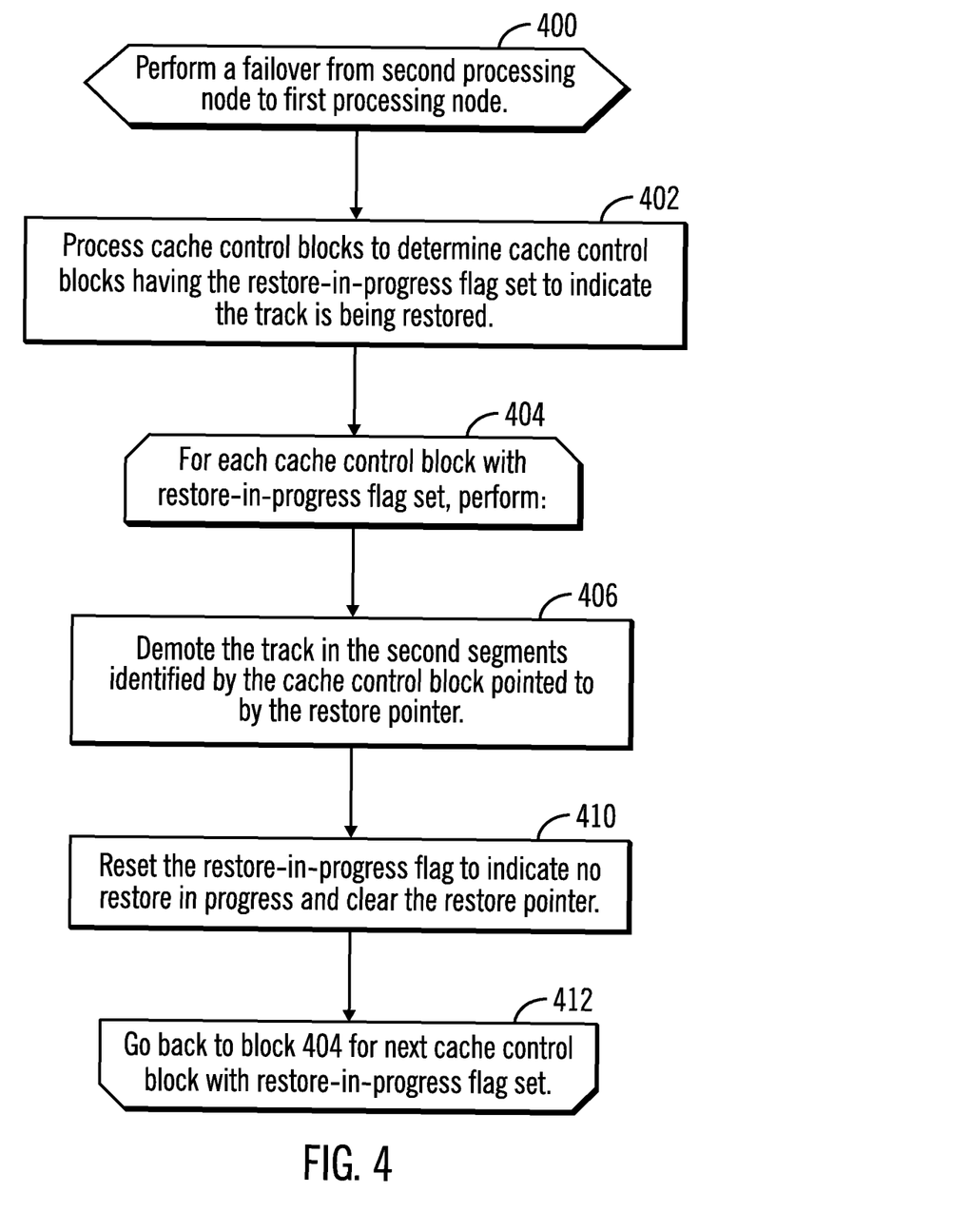
FIG. 4 illustrates an embodiment of operations to perform a failover while a restore is in progress.

FIG. 4 illustrates an embodiment of operations performed by the failover manager 116a to handle a failover from the second processing node 102b to the first processing node 102a so that the first processing node 102a would take over volumes managed by the second processing node 102b. Because the failover may interfere with any restore operations in progress before the merging at block 310 in FIG. 3, such as interfering with the transfer of the current version of the track from the NVS 120b to the cache 118a, the failover manager 116a processes (at block 402) each of the cache control blocks $200_i$ in the cache control block directory 200a to determine cache control blocks $200_i$ having the restore-in-progress flag 208 set to indicate the track was being restored when the failover occurred. The determined cache control blocks $200_1$ would comprise those blocks for which the restore was initiated, but the merging did not complete, because the merging comprises an atomic operation which would not be interrupted by a failover or warmstart.

The failover manager 116a performs a loop of operations at blocks 404 through 412 for each determined cache control block $200_1$ having the restore-in-progress flag 208 set to indicate a restore is being performed. The failover manager 116a demotes (at block 406) the current version of the track from the NVS 120b in the second segments identified by the cache control block $200_2$ pointed to by the restore pointer 210. The restore-in-progress flag 208 for the cache control block $200_i$ is reset (at block 410) to indicate no restore is in progress and the restore pointer 210 is cleared.

With the embodiment of FIG. 4, when a restore operation is interrupted by a failover before the current version of the track is merged with the previous version, the restore is terminated and the current version of the track being transferred from the other processing node 102b is demoted, and the previous version of the track remains intact in cache 118a, 118b and available for continued use and access.

The operations of FIG. 4 are performed because the transfer of the current version of the track from the NVS 120b may have been interrupted, so the cache control block and segments allocated for the track to be transferred from the NVS 120b are removed. Further, with the described embodiments, the failover interrupting the restore-in-progress does not result in invalidation of the track in the cache 118a, 118b because the previous version of the track has not been modified prior to the merger while the track was being transferred from the NVS 120b, 120a. Thus, after the failover, the restore-in-progress may be cleared and hosts can continue to access the previous version of the track at the first location in the cache 118a, 118b.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
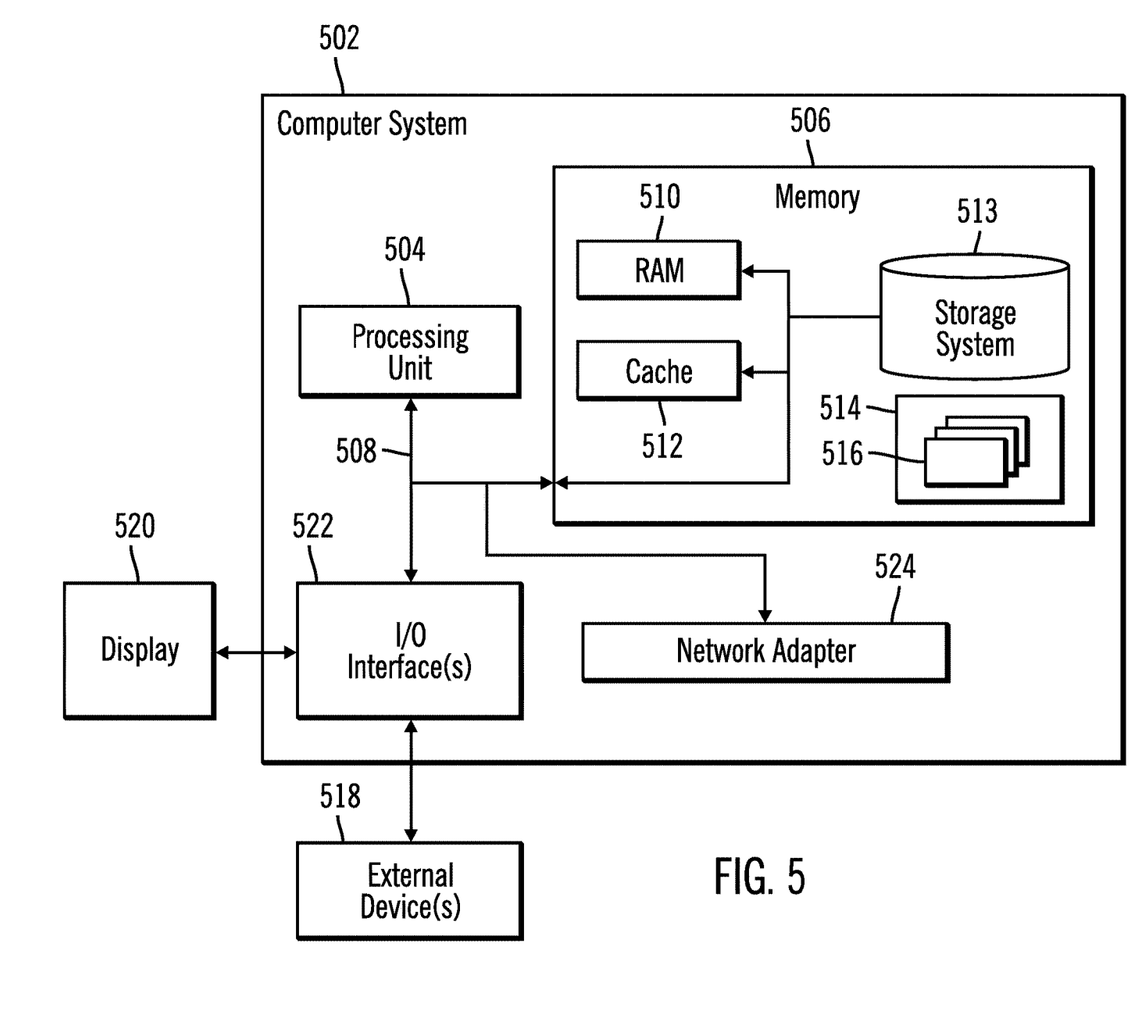
FIG. 5 illustrates an embodiment of a computer architecture used with described embodiments.

The computational components of FIG. 1, including the processing nodes 102*a*, 102*b* and host 108 may be implemented in one or more computer systems, such as the computer system 502 shown in FIG. 5. Computer system/server 502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system/server 502 is shown in the form of a general-purpose computing device. The components of computer system/server 502 may include, but are not limited to, one or more processors or processing nodes 504, a system memory 506, and a bus 508 that couples various system components including system memory 506 to processor 504. Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 513 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. The components of the computer 502 may be implemented as program modules 516 which generally carry out the functions and/or methodologies of embodiments of the invention as described herein. The systems of FIG. 1 may be implemented in one or more computer systems 502, where if they are implemented in multiple computer systems 502, then the computer systems may communicate over a network.

Computer system/server 502 may also communicate with one or more external devices 518 such as a keyboard, a pointing device, a display 520, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 522. Still yet, computer system/server 502 can communicate with one or more networks such as a local area network (LAN), a general wide area network (WAN), and/or a public network (e.g., the Internet) via network adapter 524. As depicted, network adapter 524 communicates with the other components of computer system/server 502 via bus 508. It should be understood that although not shown, other hardware and/or software components could be used in conjunction with computer system/server 502. Examples, include, but are not limited to: microcode, device drivers, redundant processing nodes, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing a track in a first storage and a second storage, the computer program product comprising a computer readable storage medium having computer readable program code embodied therein that is executable to perform operations, the operations comprising:
   storing a first version of a track in the first storage;
   transferring a second version of the track in the second storage to the first storage, wherein the second version comprises a newer version than the first version; and
   merging data from the second version in the first storage with the first version in the first storage to restore the second version to the first storage.

2. The computer program product of claim 1, wherein the merging the second version of the track into the first version of the track comprises an atomic operation that cannot be interrupted by a warmstart or failover.

3. The computer program product of claim 1, wherein the operations further comprise:
   setting a restore-in-progress flag for the first version of the track in the first storage to indicate the track is being restored before transferring the second version of the track from the second storage; and
   clearing the restore-in-progress flag to indicate no restore-in-progress in response to completing the merging of the second version into the first version.

4. The computer program product of claim 1, wherein the first storage comprises a cache memory, wherein the operations further comprise:
   demoting the second version of the track from the first storage in response to completing the merging of the second version into the first version.

5. The computer program product of claim 1, wherein the first storage comprises a cache memory, wherein the operations further comprise:
   setting a restore-in-progress flag in a first cache control block for the first version of the track in the first storage to indicate the track is being restored; and setting a pointer in the first cache control block to point to a second cache control block for the second version of the track in the first storage; and clearing the restore-in-progress flag indicated in the first cache control block to indicate no restore-in-progress in response to completing the merging the data with the first version of the data.

6. The computer program product of claim 1, wherein the operations further comprise:

setting a restore-in-progress flag for the first version of the track in the first storage to indicate a restore of the track is in progress;

determining that the merging data from the second version has not completed;

removing the second version of the track from the first storage; and resetting the restore-in-progress flag to indicate no restore in progress.

7. The computer program product of claim 6, wherein the first storage is at a first processing node and the second storage is at a second processing node, wherein the operations further comprise:

performing a failover from the second processing node to the first processing node, wherein the determining that the merging has not completed, removing the second version, and the resetting the restore-in-progress flag are performed in response to performing the failover.

8. A system for processing a track in a first storage and a second storage, comprising:

a processor;

a first storage;

a second storage; and a computer readable storage medium having computer readable program code that when executed by the processor performs operations, the operations comprising:

storing a first version of a track in the first storage;

transferring a second version of the track in the second storage to the first storage, wherein the second version comprises a newer version than the first version; and merging data from the second version in the first storage with the first version in the first storage to restore the second version to the first storage.

9. The system of claim 8, wherein the merging the second version of the track into the first version of the track comprises an atomic operation that cannot be interrupted by a warmstart or failover.

10. The system of claim 8, wherein the operations further comprise:

setting a restore-in-progress flag for the first version of the track in the first storage to indicate the track is being restored before transferring the second version of the track from the second storage; and clearing the restore-in-progress flag to indicate no restore-in-progress in response to completing the merging of the second version into the first version.

11. The system of claim 8, wherein the first storage comprises a cache memory, wherein the operations further comprise:

demoting the second version of the track from the first storage in response to completing the merging of the second version into the first version.

12. The system of claim 8, wherein the first storage comprises a cache memory, wherein the operations further comprise:

setting a restore-in-progress flag in a first cache control block for the first version of the track in the first storage to indicate the track is being restored; and setting a pointer in the first cache control block to point to a second cache control block for the second version of the track in the first storage; and clearing the restore-in-progress flag indicated in the first cache control block to indicate no restore-in-progress in response to completing the merging the data with the first version of the data.

13. The system of claim 8, wherein the operations further comprise:

setting a restore-in-progress flag for the first version of the track in the first storage to indicate a restore of the track is in progress;

determining that the merging data from the second version has not completed;

removing the second version of the track from the first storage; and resetting the restore-in-progress flag to indicate no restore in progress.

14. The system of claim 13, wherein the first storage is at a first processing node and the second storage is at a second processing node, wherein the operations further comprise:

performing a failover from the second processing node to the first processing node, wherein the determining that the merging has not completed, removing the second version, and the resetting the restore-in-progress flag are performed in response to performing the failover.

15. A method, comprising:

storing a first version of a track in a first storage;

transferring a second version of the track in a second storage storage to the first storage, wherein the second version comprises a newer version than the first version; and merging data from the second version in the first storage with the first version in the first storage to restore the second version to the first storage.

16. The method of claim 15, further comprising:

setting a restore-in-progress flag for the first version of the track in the first storage to indicate the track is being restored before transferring the second version of the track from the second storage; and clearing the restore-in-progress flag to indicate no restore-in-progress in response to completing the merging of the second version into the first version.

17. The method of claim 15, wherein the first storage comprises a cache memory, further comprising:

demoting the second version of the track from the first storage in response to completing the merging of the second version into the first version.

18. The method of claim 15, wherein the first storage comprises a cache memory, further comprising:

setting a restore-in-progress flag in a first cache control block for the first version of the track in the first storage to indicate the track is being restored; and setting a pointer in the first cache control block to point to a second cache control block for the second version of the track in the first storage; and clearing the restore-in-progress flag indicated in the first cache control block to indicate no restore-in-progress in response to completing the merging the data with the first version of the data.

19. The method of claim 15, further comprising:

setting a restore-in-progress flag for the first version of the track in the first storage to indicate a restore of the track is in progress;

determining that the merging data from the second version has not completed;

removing the second version of the track from the first storage; and resetting the restore-in-progress flag to indicate no restore in progress.

20. The method of claim 19, wherein the first storage is at a first processing node and the second storage is at a second processing node, further comprising:

performing a failover from the second processing node to the first processing node, wherein the determining that the merging has not completed, removing the second version, and the resetting the restore-in-progress flag are performed in response to performing the failover.

* * * * *